US011949090B2

United States Patent
Nishino et al.

(10) Patent No.: US 11,949,090 B2
(45) Date of Patent: Apr. 2, 2024

(54) WINDING-TYPE ELECTRODE BODY OF NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Hajime Nishino, Nara (JP); Yasuhiro Sugaya, Osaka (JP); Takanori Maruo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 708 days.

(21) Appl. No.: 17/040,691

(22) PCT Filed: Feb. 26, 2019

(86) PCT No.: PCT/JP2019/007178
§ 371 (c)(1),
(2) Date: Sep. 23, 2020

(87) PCT Pub. No.: WO2019/193870
PCT Pub. Date: Oct. 10, 2019

(65) Prior Publication Data
US 2021/0050586 A1 Feb. 18, 2021

(30) Foreign Application Priority Data

Apr. 6, 2018 (JP) .................................. 2018-074103

(51) Int. Cl.
*H01M 4/13* (2010.01)
*H01M 10/0587* (2010.01)
(Continued)

(52) U.S. Cl.
CPC .......... *H01M 4/13* (2013.01); *H01M 10/0587* (2013.01); *H01M 50/536* (2021.01); *H01M 50/574* (2021.01)

(58) Field of Classification Search
CPC .. H01M 4/13; H01M 10/0587; H01M 50/574; H01M 50/536
See application file for complete search history.

(56) References Cited

U.S. PATENT DOCUMENTS

| 2014/0178732 A1 | 6/2014 | Mizawa et al. |
| 2018/0013173 A1 | 1/2018 | Kawada et al. |

FOREIGN PATENT DOCUMENTS

| CN | 107210423 A | 9/2017 |
| JP | 9-180704 A | 7/1997 |

(Continued)

OTHER PUBLICATIONS

International Search Report dated Apr. 16, 2019, issued in counterpart International Application No. PCT/JP2019/007178. (2 pages).

(Continued)

*Primary Examiner* — Jane J Rhee
(74) *Attorney, Agent, or Firm* — WHDA, LLP (57) ABSTRACT

A winding-start region that is closer to a winding-start side than a positive electrode core exposed part has positive electrode mixture unit amounts of a positive electrode inner mixture layer and a positive electrode outer mixture layer that are approximately uniform or increasing toward a winding-end side in the winding direction. A winding-start facing region has negative electrode mixture unit amounts of a negative electrode inner mixture layer and a negative electrode outer mixture layer that are approximately uniform or increasing toward the winding-end side. The positive electrode inner mixture layer and the positive electrode outer mixture layer each have a positive electrode mixture unit amount that differs at two or more locations, excluding the (Continued)

positive electrode core exposed part. The negative electrode inner mixture layer and the negative electrode outer mixture each have a fluctuating part where the negative electrode mixture unit amount fluctuates toward the winding-end side.

6 Claims, 7 Drawing Sheets

(51) Int. Cl.
 *H01M 50/536* (2021.01)
 *H01M 50/574* (2021.01)

(56) References Cited

FOREIGN PATENT DOCUMENTS

| | | |
|---|---|---|
| JP | 2004-311282 A | 11/2004 |
| JP | 2011-138729 A | 7/2011 |
| JP | 2013-48027 A | 3/2013 |
| WO | 2016/116971 A1 | 7/2016 |

OTHER PUBLICATIONS

Extended (Supplementary) European Search Report dated Jul. 5, 2021, issued in counterpart EP application No. 19781959.2. (41 pages).

English Translation of Chinese Search Report dated Jan. 5, 2024, issued in counterpart CN application No. 201980022873.3. (3 pages).

WINDING-TYPE ELECTRODE BODY OF NON-AQUEOUS ELECTROLYTE SECONDARY BATTERY, AND NON-AQUEOUS ELECTROLYTE SECONDARY BATTERY

TECHNICAL FIELD

The present disclosure generally relates to a winding-type electrode body of a non-aqueous electrolyte secondary battery, and a non-aqueous electrolyte secondary battery.

BACKGROUND

An exemplary conventional non-aqueous electrolyte secondary battery is disclosed in Patent Literature 1. In the non-aqueous electrolyte secondary battery (hereinafter, simply referred to as a secondary battery), an electrode sheet included in a winding-type electrode body has an electrode material applied on an outer periphery side, and an amount of the electrode material is continuously or gradually decreased from a winding-start side toward a winding-finish side. In this way, the amount of the electrode material whose extension amount decreases as a curvature decreases is decreased toward the winding-finish side based on the extension amount, so that the amount of the electrode material on the outer peripheral side becomes approximately uniform regardless of a position in a winding direction.

CITATION LIST

Patent Literature

Patent Literature 1: JP Hei9 (1997)-180704A

SUMMARY

In the secondary battery disclosed in Patent Literature 1, since the electrode material on the outer peripheral side surface of the electrode sheet is continuously or gradually decreased toward the winding-finish side in the winding direction, the electrode material is maximized on the winding-start side where the curvature is large, and the film thickness of the electrode material layer is maximized on the winding-start side where the curvature is large. Accordingly, on the winding-start side where the curvature is large, the electrode material is easily broken, and is easily cracked due to extension and contraction caused at the time of charge and discharge.

It is an advantage of the present disclosure to provide a winding-type electrode body in which on a winding-start side, where a curvature is large, an electrode material layer is hardly broken and a mixture layer of an electrode is hardly damaged, and a non-aqueous electrolyte secondary battery.

To solve the above-described problems, a winding-type electrode body of a non-aqueous electrolyte secondary battery of the present disclosure is a winding-type electrode body of a non-aqueous electrolyte secondary battery, in which a long first electrode and a long second electrode are wound together with a separator interposed therebetween. The first electrode includes a long first electrode core, a first electrode inner mixture layer provided on an inner surface of the first electrode core, and a first electrode outer mixture layer provided on an outer surface of the first electrode core. The second electrode includes a long second electrode core, a second electrode inner mixture layer provided on an inner surface of the second electrode core, and a second electrode outer mixture layer provided on an outer surface of the second electrode core. The first electrode includes a first electrode core exposed part that is positioned spaced from both of a winding-start end and a winding-finish end in a winding direction, and exposes the first electrode core to be electrically connected with a first electrode lead. In a winding-start region closer to a winding-start side in the winding direction than the first electrode core exposed part, a first electrode mixture unit amount, which is a first electrode mixture amount per unit length in the winding direction of each of the first electrode inner mixture layer and the first electrode outer mixture layer, is approximately uniform or is increased toward a winding-finish side in the winding direction. In a winding-start facing region facing the winding-start region across the separator, a second electrode mixture unit amount, which is a second electrode mixture amount per unit length in the winding direction of each of the second electrode inner mixture layer and the second electrode outer mixture layer, is approximately uniform or is increased toward the winding-finish side in the winding direction. Each of the first electrode inner mixture layer and the first electrode outer mixture layer has the first electrode mixture unit amount that differs at two or more positions in the winding direction except for a region in the winding direction where the first electrode core exposed part is provided. Each of the second electrode inner mixture layer and the second electrode outer mixture layer includes a changing part where the second electrode mixture unit amount is changed toward the winding-finish side in the winding direction.

According to the winding-type electrode body according to the present disclosure, on a winding-start side where a curvature is large, an electrode material layer is hardly broken and a mixture layer of an electrode is hardly damaged.

DESCRIPTION OF EMBODIMENTS

Hereinafter, an exemplary embodiment of the present disclosure will be described in detail with reference to the attached drawings. Note that it is envisaged from the beginning that when a plurality of exemplary embodiments and variations are described below, distinctive elements of the plurality of exemplary embodiments and variations are appropriately combined to construct new exemplary embodiments. In the examples below, the same reference numeral will be given to the same components in the drawings, and duplicated description will be omitted. The plurality of drawings include schematic diagrams, and dimensional ratios of each member are not necessarily the same among different drawings.

First Embodiment

Figure 1:
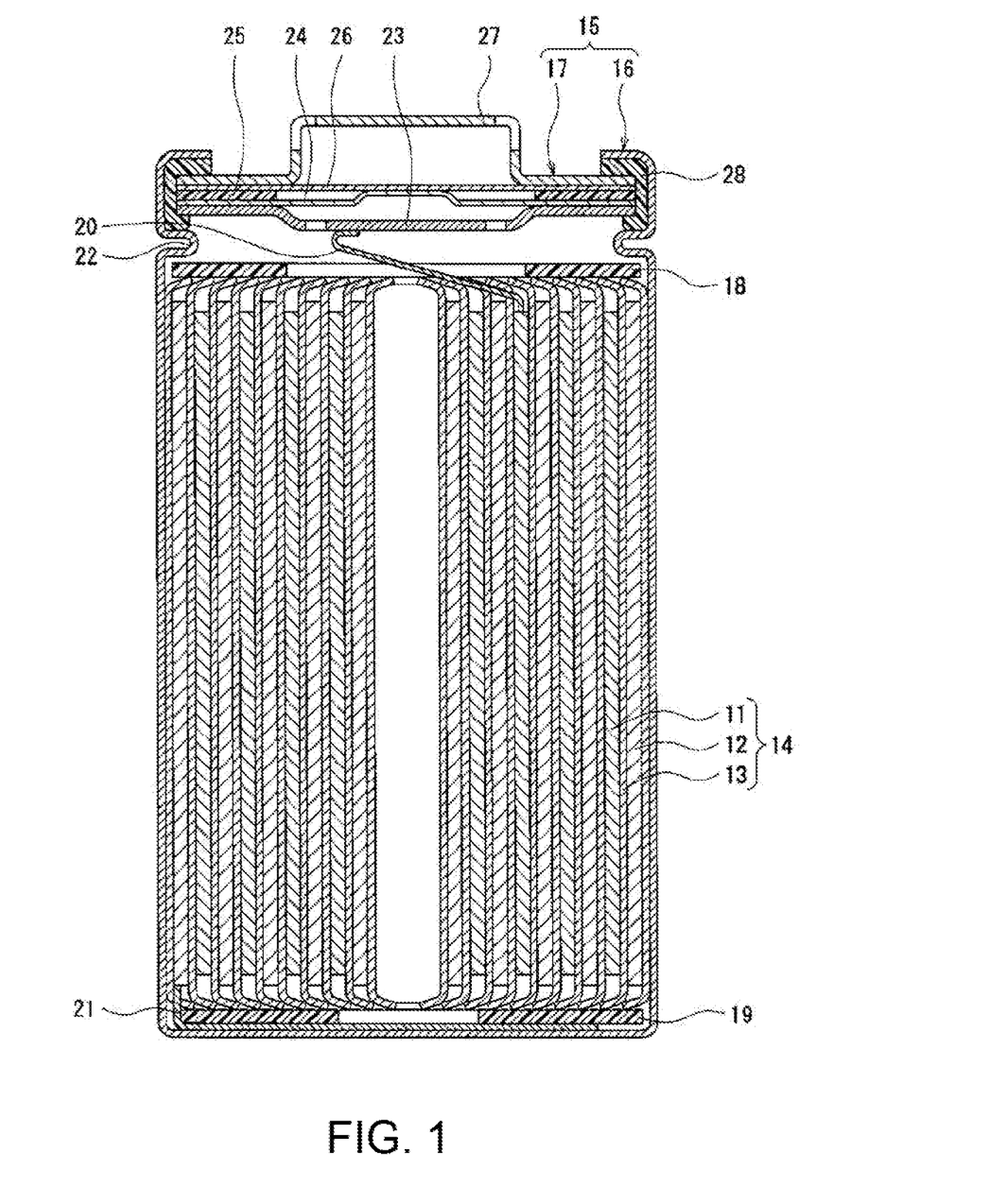
FIG. 1 is an axial sectional view of a non-aqueous electrolyte secondary battery according to a first embodiment of the present disclosure.
Figure 2:
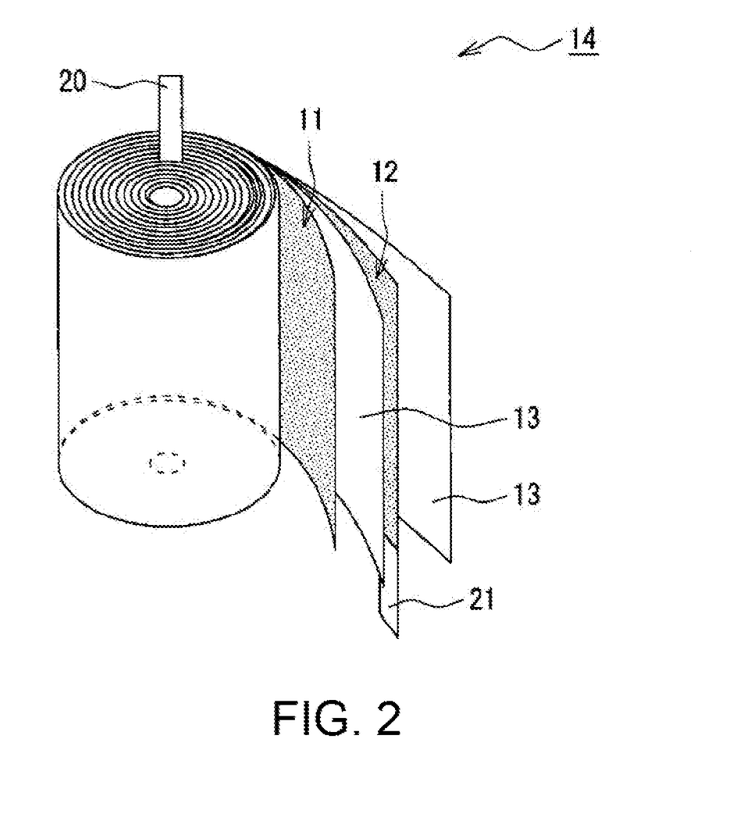
FIG. 2 is a perspective view of an electrode body of the above-described non-aqueous electrolyte secondary battery.

FIG. 1 is an axial sectional view of a non-aqueous electrolyte secondary battery 10 according to a first embodiment of the present disclosure, and FIG. 2 is a perspective view of an electrode body 14 of the non-aqueous electrolyte secondary battery 10. As illustrated in FIG. 1, the non-aqueous electrolyte secondary battery (hereinafter, simply referred to as a secondary battery) 10 includes a winding-type electrode body 14, a non-aqueous electrolyte (not illustrated), and a battery case 15 configured to house the electrode body 14 and the non-aqueous electrolyte. As illustrated in FIG. 2, the electrode body 14 includes a positive electrode 11 serving as a first electrode, a negative electrode 12 serving as a second electrode, and a separator 13 interposed between the positive electrode 11 and the negative electrode 12, and has a wound structure in which the positive electrode 11 and the negative electrode 12 are wound together with the separator 13 interposed therebetween. Returning to FIG. 1 again, the battery case 15 includes a bottomed cylindrical outer case 16, and a sealing body 17 that closes an opening of the outer case 16. In addition, the non-aqueous electrolyte secondary battery 10 includes a resin gasket 28 disposed between the outer case 16 and the sealing body 17.

The non-aqueous electrolyte contains a non-aqueous solvent and an electrolyte salt dissolved in the non-aqueous solvent. Examples of the non-aqueous solvent include esters, ethers, nitriles, amides, and a mixed solvent of two or more of these solvents. The non-aqueous solvent may contain a halogen-substituted compound produced by at least partially substituting the hydrogen atoms of the solvent with the halogen atoms such as fluorine. Note that the non-aqueous electrolyte is not limited to a liquid electrolyte, and may be a solid electrolyte using a gel polymer or the like. Lithium salts such as $LiPF_6$ may be used as the electrolyte salt.

The electrode body 14 includes a long positive electrode 11, a long negative electrode 12, and two long separators 13. In addition, the electrode body 14 includes a positive electrode lead 20 serving as a first electrode lead joined to the positive electrode 11, and a negative electrode lead 21 joined to the negative electrode 12. To prevent the precipitation of lithium, the negative electrode 12 is formed to have a dimension one size larger than that of the positive electrode 11, and is formed to have longer dimensions in a longitudinal direction and a short direction (up-down direction) than the positive electrode 11. The two separators 13 are formed to at least have a dimension one size larger than that of the positive electrode 11, and, for example, are disposed to sandwich the positive electrode 11 therebetween.

As the separator 13, a porous sheet having ion permeability and an insulating property is used, for example. Specific examples of the porous sheet include a microporous thin film, a woven fabric, and a nonwoven fabric. Preferred examples of a material of the separator 13 include olefin resins such as polyethylene and polypropylene. The separator 13 has a thickness of 10 μm to 50 μm and a melting point of about 130° C. to 180° C., for example. Note that the negative electrode 12 may form a winding-start end of the electrode body 14, but in general, the separator 13 extends beyond a winding-start side end of the negative electrode 12 and therefore a winding-start side end of the separator 13 becomes the winding-start end of the electrode body 14.

In the example in FIG. 1 and FIG. 2, the positive electrode lead 20 is electrically connected to an intermediate portion such as a central portion in a winding direction in a positive electrode core serving as a first electrode core, and the negative electrode lead 21 is electrically connected to a winding-finish end portion in the winding direction in a negative electrode core serving as a second electrode core. However, the negative electrode lead may be electrically connected to a winding-start end portion in the winding direction in the negative electrode core. Alternatively, the electrode body may have two negative electrode leads such that one negative electrode lead is electrically connected to the winding-start end portion in the winding direction in the negative electrode core and the other negative electrode lead is electrically connected to the winding-finish end portion in the winding direction in the negative electrode core. Alternatively, a winding-finish side end portion in the winding direction in the negative electrode core may be brought into abutment with an inner surface of the outer case 16 such that the negative electrode is electrically connected to the outer case. A structure in which the positive electrode lead 20 is electrically connected to the positive electrode core and a structure in which the negative electrode lead 21 is electrically connected to the negative electrode core will be described later in detail using FIG. 3.

As illustrated in FIG. 1, the secondary battery 10 further includes an insulating plate 18 disposed on the upper side of the electrode body 14 and an insulating plate 19 disposed on the lower side of the electrode body 14. In the example illustrated in FIG. 1, the positive electrode lead 20 attached to the positive electrode 11 extends to the sealing body 17 side through a through hole in the insulating plate 18, and the negative electrode lead 21 attached to the negative electrode 12 extends to a bottom side of the outer case 16 through the outside of the insulating plate 19. The positive electrode lead 20 is connected to a lower surface of a filter 23, which is a bottom plate of the sealing body 17, by welding or the like, and a cap 27, which is a top plate of the sealing body 17 electrically connected to the filter 23, serves as a positive electrode terminal. The negative electrode lead 21 is connected to an inner surface of the bottom of the outer case 16 by welding or the like, and the outer case 16 serves as a negative electrode terminal.

The outer case 16 is a metallic container formed in a bottomed cylindrical shape. The gasket 28 is provided between the outer case 16 and the sealing body 17 to seal an inner space of the battery case 15. The outer case 16 has a grooving portion 22, which is formed, for example, by pressing the side surface portion from the outside. The grooving portion 22 is preferably formed in an annular shape along the circumferential direction of the outer case 16, and the sealing body 17 is supported on the upper surface of the grooving portion 22. Furthermore, the upper end portion of the outer case 16 is bent inward and is caulked to the peripheral edge portion of the sealing body 17.

The sealing body 17 has a structure in which the filter 23, a lower valve body 24, an insulating member 25, an upper valve body 26, and the cap 27 are laminated in order from the electrode body 14 side. Each of the members constituting the sealing body 17 has, for example, a disc shape or a ring shape, and these members, excluding the insulating member 25, are electrically connected to one another. The lower valve body 24 and the upper valve body 26 are connected to each other at the respective central portions, and the insulating member 25 is interposed between the peripheral edge portions of the lower valve body 24 and the upper valve body 26. When an internal pressure of the battery is increased, the lower valve body 24 and the upper valve body 26 are deformed in a manner to be pushed up toward the cap 27 side and are broken, which causes disconnection of the current path between the lower valve body 24 and the upper valve body 26. When the internal pressure is further increased, the upper valve body 26 is broken, and gas is discharged from an opening of the cap 27.

Figure 3A:
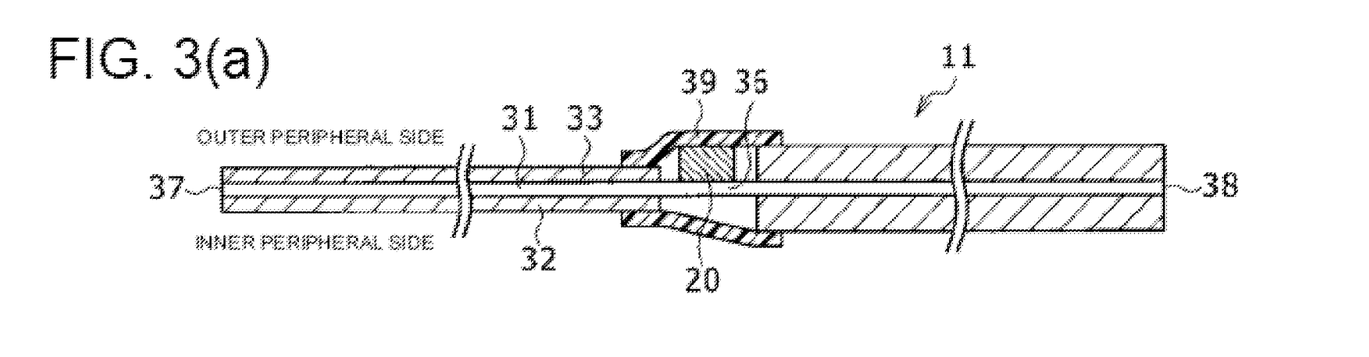
FIG. 3(a) is a schematic sectional view illustrating a cross section including longitudinal direction and thickness direction of a positive electrode in the above-described electrode body in a state in which the positive electrode is spread in an elongated shape.
Figure 3B:
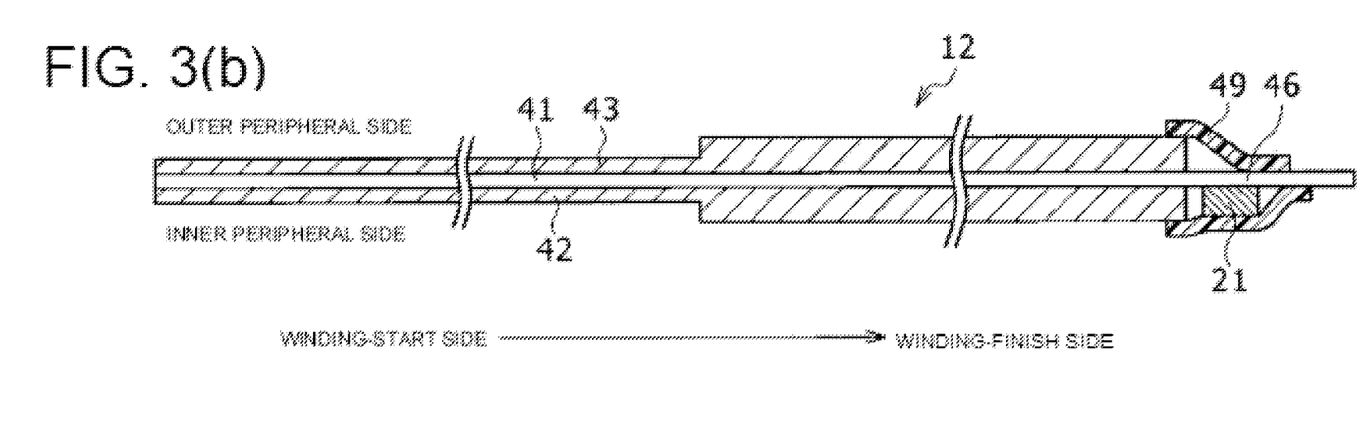
FIG. 3(b) is a schematic sectional view illustrating a cross section including the longitudinal direction and thickness direction of a negative electrode in the above-described electrode body in a state in which the negative electrode is spread in an elongated shape.

FIG. 3(a) is a schematic sectional view illustrating a cross section including the longitudinal direction and thickness direction of the positive electrode 11 in a state in which the positive electrode 11 is spread in an elongated shape, and FIG. 3(b) is a schematic sectional view illustrating a cross section including the longitudinal direction and thickness direction of the negative electrode 12 in a state in which the negative electrode 12 is spread in an elongated shape. Next, the structures, the materials, and the like of the positive electrode 11 and the negative electrode 12 of the secondary battery 10 will be described in detail with reference to FIG. 3. Note that in FIG. 3 and the following FIG. 4 to FIG. 7, differences in thicknesses of mixture layers are exaggerated to clarify an electrode structure of the secondary battery of the present disclosure.

[Positive Electrode]

(Structure of Positive Electrode)

As illustrated in FIG. 3(a), the positive electrode 11 includes a long positive electrode core 31 serving as a first electrode core, a positive electrode inner mixture layer 32 serving as a first electrode inner mixture layer, and a positive electrode outer mixture layer 33 serving as a first electrode outer mixture layer. The positive electrode inner mixture layer 32 is provided on an inner surface of the positive electrode core 31, and the positive electrode outer mixture layer 33 is provided on an outer surface of the positive electrode core 31.

The positive electrode 11 includes, in an intermediate portion in the winding direction (corresponding to the longitudinal direction of the positive electrode 11 illustrated in FIG. 3(a)), a positive electrode core exposed part 36 serving as a first electrode core exposed part where the positive electrode core 31 is exposed. The positive electrode core exposed part 36 is provided at a position spaced from both of a winding-start end 37 and a winding-finish end 38 in the winding direction. The positive electrode lead 20 serving as the first electrode lead is electrically connected to the positive electrode core exposed part 36. The positive electrode lead 20 is joined to the positive electrode core exposed part 36 by spot welding or the like, thereby being electrically connected to the positive electrode core exposed part 36.

Note that in the example illustrated in FIG. 3, the positive electrode lead 20 is joined to the outer surface of the positive electrode core 31, but the positive electrode lead may be also joined to the inner surface of the positive electrode core.

Regarding the positive electrode inner mixture layer 32, a positive electrode winding-start mixture unit amount, which is a positive electrode mixture amount per unit length in the winding direction in a winding-start region closer to a winding-start side in the winding direction than the positive electrode core exposed part 36, is approximately uniform regardless of a position in the winding direction. Regarding the positive electrode inner mixture layer 32, a positive electrode winding-finish mixture unit amount, which is a positive electrode mixture unit amount in a winding-finish region closer to a winding-finish side in the winding direction than the positive electrode core exposed part 36, is approximately uniform regardless of a position in the winding direction, and is larger than the positive electrode winding-start mixture unit amount. The positive electrode mixture unit amount, which is a positive electrode mixture amount per unit length in the winding direction, is an example of a first electrode mixture unit amount, the positive electrode winding-start mixture unit amount is an example of a first electrode winding-start mixture unit amount, and the positive electrode winding-finish mixture unit amount is an example of a first electrode winding-finish mixture unit amount (which also applies to second to fourth embodiments). In addition, regarding the positive electrode outer mixture layer 33, the positive electrode winding-start mixture unit amount, which is a positive electrode mixture unit amount in the winding-start region, is approximately uniform regardless of a position in the winding direction. Furthermore, regarding the positive electrode outer mixture layer 32, the positive electrode winding-finish mixture unit amount, which is a positive electrode mixture unit amount in the winding-finish region, is approximately uniform regardless of a position in the winding direction, and is larger than the positive electrode winding-start mixture unit amount.

(Material of Positive Electrode)

For the positive electrode core 31, foil of metal that is suitable in a potential range of the positive electrode 11, such as aluminum and aluminum alloy, a film having such metal placed as a surface layer, and the like, may be used. Each of the positive electrode inner mixture layer 32 and the positive electrode outer mixture layer 33 contains a positive electrode active material, a conductive material, a binder, and the like. For the positive electrode active material, a lithium-metal complex oxide is used, for example. Examples of a metal element contained in the lithium-metal complex oxide include Ni, Co, Mn, Al, B, Mg, Ti, V, Cr, Fe, Cu, Zn, Ga, Sr, Zr, Nb, In, Sn, Ta, and W. An example of a suitable lithium-metal complex oxide is a lithium-metal complex oxide containing at least one of Ni, Co and Mn. Specific examples of the lithium-metal complex oxide include a lithium-metal complex oxide containing Ni, Co, and Mn, and a lithium-metal complex oxide containing Ni. Co, and Al. Note that inorganic particles such as a tungsten oxide, an aluminum oxide, or a lanthanoid-containing compound may be attached to particle surfaces of the lithium-metal complex oxide.

(Method of Producing Positive Electrode)

The positive electrode 11 is produced in the following manner, for example. The positive electrode active material is mixed with Conductive agent, binding agent and the like. The mixture is kneaded in a dispersion medium to form a paste of positive electrode active material slurry. Thereafter, the positive electrode active material shiny is applied on the inner surface of the hoop-like positive electrode core 31 formed of metallic foil such as aluminum and is also applied on the outer surface of the positive electrode core 31. Subsequently, the positive electrode active material slurry applied on the inner and outer surfaces of the positive electrode core 31 is dried and compressed to form the positive electrode inner mixture layer 32 on the inner surface of the positive electrode core 31 and form the positive electrode outer mixture layer 32 on the outer surface of the positive electrode core 31. Finally, a positive electrode plate on which the positive electrode mixture layer is formed is cut with predetermined dimensions to produce the positive electrode 11.

The positive electrode active material slurry is applied to the positive electrode core 31 as follows, for example. Specifically, the positive electrode core 31 is relatively moved in its extending direction at a constant speed with respect to a discharge nozzle for discharging the positive electrode active material slurry. Then, the positive electrode active material slurry is discharged in a constant amount from the discharge nozzle onto the positive electrode core 31 while moving the positive electrode core 31 from the winding-start end of the positive electrode core 31 to the winding-start end of the positive electrode core exposed part, and the positive electrode active material slurry is discharged, in a constant amount larger than the above-described constant amount, from the discharge nozzle onto the positive electrode core 31 while moving the positive electrode core 31 from the winding-finish end of the positive electrode core exposed part to the winding-finish end of the positive electrode core 31. This discharge is performed on the inner and outer surfaces of the positive electrode core 31 so that the positive electrode active material slurry is applied to the positive electrode core 31.

[Negative Electrode]

(Structure of Negative Electrode)

As illustrated in FIG. 3(*b*), the negative electrode 12 includes a long negative electrode core 41 serving as a second electrode core, a negative electrode inner mixture layer 42 serving as a second electrode inner mixture layer, and a negative electrode outer mixture layer 43 serving as a second electrode outer mixture layer, the negative electrode inner mixture layer 42 is provided on an inner surface of the negative electrode core 41, and the negative electrode outer mixture layer 43 is provided on an outer surface of the negative electrode core 41.

The negative electrode 12 includes, in an end portion on the winding-finish side in the winding direction, a negative electrode core exposed part 46 where the negative electrode core 41 is exposed. The negative electrode lead 21 is joined to the negative electrode core exposed part 46 by spot welding or the like, thereby being electrically connected to the negative electrode core exposed part 46. Note that in the example illustrated in FIG. 3, the negative electrode lead 21 is joined to the inner surface of the negative electrode core 41, but the negative electrode lead may be also joined to the outer surface of the negative electrode core.

Regarding the negative electrode inner mixture layer 42, a negative electrode winding-start mixture unit amount, which is a negative electrode mixture amount per unit length in the winding direction in a winding-start facing region facing the above-described winding-start region of the positive electrode 11 across the separator 13 (see FIG. 2), is approximately uniform. In addition, regarding the negative electrode inner mixture layer 42, a negative electrode winding-finish mixture unit amount, which is a negative electrode mixture unit amount in a winding-finish facing region facing the above-described winding-finish region of the positive electrode 11 across the separator 13, is approximately uniform regardless of a position in the winding direction, and is larger than the negative electrode winding-start mixture unit amount. The negative electrode mixture unit amount, which is a negative electrode mixture amount per unit length in the winding direction, is an example of a second electrode mixture unit amount, the negative electrode winding-start mixture unit amount is an example of a second electrode winding-start mixture unit amount, and the negative electrode winding-finish mixture unit amount is an example of a second electrode winding-finish mixture unit amount (which also applies to second to fourth embodiments). In addition, regarding the negative electrode outer mixture layer 43, the negative electrode winding-start mixture unit amount, which is a negative electrode mixture unit amount in the above-described winding-start facing region, is approximately uniform regardless of a position in the winding direction. Furthermore, regarding the negative electrode inner mixture layer 42, the negative electrode winding-finish mixture unit amount, which is a negative electrode mixture unit amount in the above-described winding-finish facing region, is approximately uniform regardless of a position in the winding direction, and is larger than the negative electrode winding-start mixture unit amount.

(Material of Negative Electrode)

For the negative electrode core 41, foil of metal that is suitable in a potential range of the negative electrode 12, such as copper and copper alloy, a film having such metal placed as a surface layer, and the like, may be used. Each of the negative electrode inner mixture layer 42 and the negative electrode outer mixture layer 43 contains a negative electrode active material, a conductive material, and a binder such as a styrene-butadiene rubber (SBR). The negative electrode active material preferably contains graphite such as natural graphite (such as natural flake graphite, massive graphite, or earthy graphite) or artificial graphite (such as massive artificial graphite, or graphitized mesophase carbon microbeads). A negative electrode active material other than the graphite may be contained together with the graphite in each of the negative electrode inner mixture layer 42 and the negative electrode outer mixture layer 43. Examples of the negative electrode active material other than the graphite include a metal such as Si or Sn, forming an alloy with lithium, an alloy containing such a metal, and a compound containing such a metal. Among those mentioned above, a silicon compound containing Si is preferable. The content of the silicon compound in the negative electrode inner mixture layer 42 and the negative electrode outer mixture layer 43 is, with respect to the total mass of the negative electrode active material, for example, 1 to 15 percent by mass, and preferably 5 to 10 percent by mass.

As the above-described silicon compound, a silicon oxide represented by $SiO_x(0.5 \leq x \leq 1.6)$ is exemplified. The silicon oxide represented by $SiO_x$ has a structure in which, for example, fine particles of Si are dispersed in a matrix of $SiO_2$. In addition, a silicon compound represented by $Li_{2y}SiO_{(2+y)}(0<y<2)$ having a structure in which fine particles of Si are dispersed in a lithium silicate phase may be used.

On the particle surface of the silicon compound, a conductive coating film is preferably formed. As a material forming the conductive coating film, at least one selected from a carbon material, metal, and a metal compound may be exemplified.

Among those mentioned above, a carbon material such as an amorphous carbon is preferable. A carbon coating film can be formed, for example, by a CVD method using acethylene, methane, or the like, a method in which the silicon compound particles are mixed with coal pitch, petroleum pitch, a phenol resin or the like, followed by performing a heat treatment, or the like. The conductive coating film may be formed by attaching a conductive filler such as carbon black to the particle surface of the silicon compound using a binder.

(Method of Producing Negative Electrode)

The negative electrode 12 is produced in the following manner, for example. The negative electrode active material is mixed with conductive agent, binding agent and the like. The mixture is kneaded in a dispersion medium to form a paste of negative electrode active material slurry. Thereafter, the negative electrode active material slimy is applied on the inner surface of the hoop-like negative electrode core 41 formed of metallic foil such as copper and is also applied on the outer surface of the negative electrode core 41. Subsequently, the negative electrode active material slurry applied on the inner and outer surfaces of the negative electrode core 41 is dried and compressed to form the negative electrode inner mixture layer 42 on the inner surface of the negative electrode core 41 and form the negative electrode outer mixture layer 43 on the outer surface of the negative electrode core 41.

The negative electrode active material slurry is applied to the negative electrode core 41 as follows, for example. Specifically, the negative electrode core 41 is relatively moved in its extending direction at a constant speed with respect to a discharge nozzle for discharging the negative electrode active material slurry. Then, the negative electrode active material slurry is discharged in a constant amount from the discharge nozzle onto the negative electrode core 41 while moving the negative electrode core 41 from the winding-start end of the negative electrode core 41 to a positive electrode exposure facing position facing any winding position of the positive electrode core exposed part 36. An amount of the negative electrode active material slurry to be discharged from the discharge nozzle onto the negative electrode core 41 is changed at the positive electrode exposure facing position, and the negative electrode active material slurry is discharged, in a constant amount larger than the above-described constant amount, from the discharge nozzle onto the negative electrode core 41 while moving the negative electrode core 41 from the positive electrode exposure facing position to the negative electrode core exposed part 46. This discharge is performed on the inner and outer surfaces of the negative electrode core 41 so that the negative electrode active material slurry is applied to the negative electrode core 41.

The electrode body 14 of the secondary battery 10 is formed by winding the positive electrode 11 and the negative electrode 12, which are thus formed, with the electrode sandwiched between two separators 13. Note that, although not described in detail, as illustrated in FIG. 3(*a*), the positive electrode 11 includes an insulating tape 39 having an insulating property. The insulating tape 39 is attached to a surface of the positive electrode lead 20 on the side opposite to the positive electrode core 31 side and portions in the positive electrode outer mixture layer 33 that are positioned on both sides of the positive electrode core exposed part 36 in the winding direction, and coves an end portion of the positive electrode lead 20 on the positive electrode core 31 side in an extending direction of the positive electrode lead 20. The insulating tape 39 is provided mainly to prevent a short circuit from occurring in the electrode body 14 due to the attachment of a conductive foreign object to the positive electrode lead 20. Note that in the example illustrated in FIG. 3(*a*), the positive electrode lead 20 is joined to the outer surface of the positive electrode core 31, and the insulating tape 39 is attached to the positive electrode lead 20 and is attached to the portions in the positive electrode outer mixture layer 33 that are positioned on both sides of the positive electrode core exposed part 36 in the winding direction. However, the positive electrode lead may be joined to the inner surface of the positive electrode core, and the insulating tape may be attached to the positive electrode lead and may be attached to the portions in the positive electrode inner mixture layer that are positioned on both sides of the positive electrode core exposed part in the winding direction.

In addition, as illustrated in FIG. 3(*b*), the negative electrode 12 includes an insulating tape 49 having an insulating property. The insulating tape 49 is attached to a surface of the negative electrode lead 21 on the side opposite to the negative electrode core 41 side, the negative electrode inner mixture layer 42, and the winding-finish side end portion of the negative electrode core exposed part 46, and covers an end portion of the negative electrode lead 21 on the negative electrode core 41 side in an extending direction of the negative electrode lead 21. The insulating tape 49 is provided mainly to prevent a short circuit from occurring in the electrode body 14 due to the attachment of a conductive foreign object to the negative electrode lead 21. Note that in the example illustrated in FIG. 3(*b*), the negative electrode lead 21 is joined to the inner surface of the negative electrode core 41, and the insulating tape 49 is attached to the negative electrode lead 21 and is attached to the negative electrode inner mixture layer 42 and the negative electrode core exposed part 46. However, the negative electrode lead may be joined to the outer surface of the negative electrode core, and the insulating tape may be attached to the negative electrode lead and may be attached to the negative electrode outer mixture layer and the negative electrode core exposed part.

As described above, according to the first embodiment, in each of the positive electrode inner mixture layer 32 and the positive electrode outer mixture layer 33, the positive electrode winding-start mixture unit amount in the winding-start region in the positive electrode mixture unit amount is approximately uniform regardless of a position in the winding direction, and is smaller than the positive electrode winding-finish mixture unit amount in the winding-finish region in the positive electrode mixture unit amount. In addition, in each of the negative electrode inner mixture layer 42 and the negative electrode outer mixture layer 43, the negative electrode winding-start mixture unit amount in the winding-start facing region in the negative electrode mixture unit amount is approximately uniform regardless of a position in the winding direction, and is smaller than the negative electrode winding-finish mixture unit amount in the winding-finish facing region in the negative electrode mixture unit amount. Accordingly, in each of the positive electrode inner and outer mixture layers 32 and 33, the positive electrode mixture unit amount in the winding-start region where the curvature is particularly large may be smaller than the positive electrode mixture unit amount in the winding-finish region, and in each of the negative electrode inner and outer mixture layers 42 and 43, the negative electrode mixture unit amount in the winding-start facing region where the curvature is particularly large may be smaller than the negative electrode mixture unit amount in the winding-finish facing region. This can suppress damage to the positive electrode mixture layers 32 and 33 in the winding-start region, and can also suppress damage to the negative electrode mixture layers 42 and 43 in the winding-start facing region.

In each of the positive electrode inner and outer mixture layers 32 and 33, the positive electrode mixture unit amount in the winding-finish region is larger than the positive electrode mixture unit amount in the winding-start region. In addition, in each of the negative electrode inner and outer mixture layers 42 and 43, the negative electrode mixture unit amount in the winding-finish facing region is larger than the negative electrode mixture unit amount in the winding-start facing region. Accordingly, since the positive electrode mixture unit amount in the winding-finish region and the negative electrode mixture unit amount in the winding-finish facing region are increased, the total amount of the positive electrode mixture amount and the negative electrode mixture amount in the secondary battery 10 can be prevented from being reduced even when the positive electrode mixture unit amount in the winding-start region and the negative electrode mixture unit amount in the winding-start facing region are reduced. This can prevent the capacity of the secondary battery 10 from being decreased, and can prevent the performance of the secondary battery 10 from being degraded.

Furthermore, each of the positive electrode inner and outer mixture layers 32 and 33 can be formed by changing the discharge amount of the positive electrode mixture unit amount with the positive electrode core exposed part 36 serving as a boundary, and each of the negative electrode inner and outer mixture layers 42 and 43 can be formed by changing the discharge amount of the negative electrode mixture unit amount with the positive electrode exposure facing position serving as a boundary. Therefore, in particular, each of the positive electrode inner and outer mixture layers 32 and 33 can be formed simply by changing the discharge amount during the time lag generated when the positive electrode core exposed part 36 passes through the discharge nozzle, whereby the positive electrode inner and outer mixture layers 32 and 33 can be easily formed.

Second Embodiment

Next, a secondary battery in a second embodiment will be described. Note that also in the following embodiments including the second embodiment, as in the first embodiment, a case where the first electrode is a positive electrode and the second electrode is a negative electrode will be described. A structure of the secondary battery in the second embodiment is the same as that of the secondary battery 10 in the first embodiment except for a positive electrode 111 and a negative electrode 112. Thus, the following description will focus on the structures of the positive electrode 111 and the negative electrode 112 in the secondary battery in the second embodiment, and the other description will be omitted.

Figure 4A:
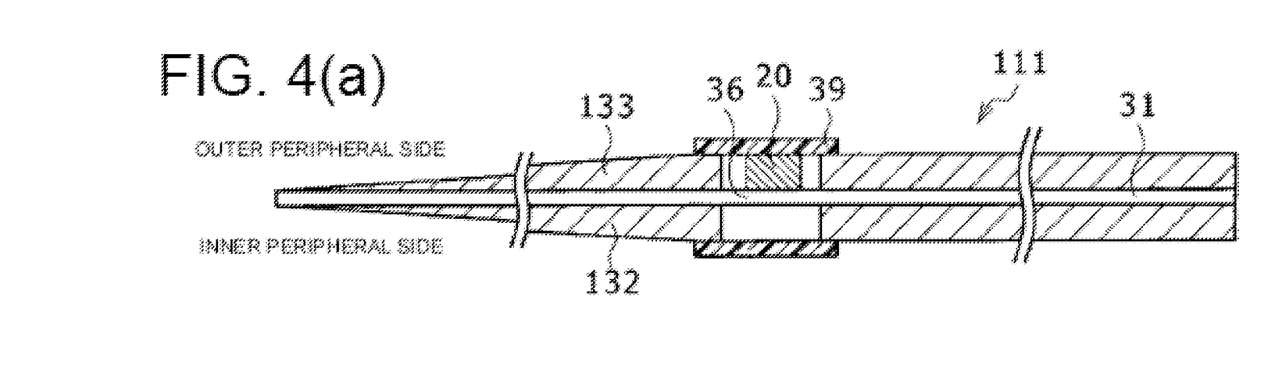
FIG. 4(a) is a schematic sectional view corresponding to FIG. 3(a), in a non-aqueous electrolyte secondary battery in a second embodiment.
Figure 4B:
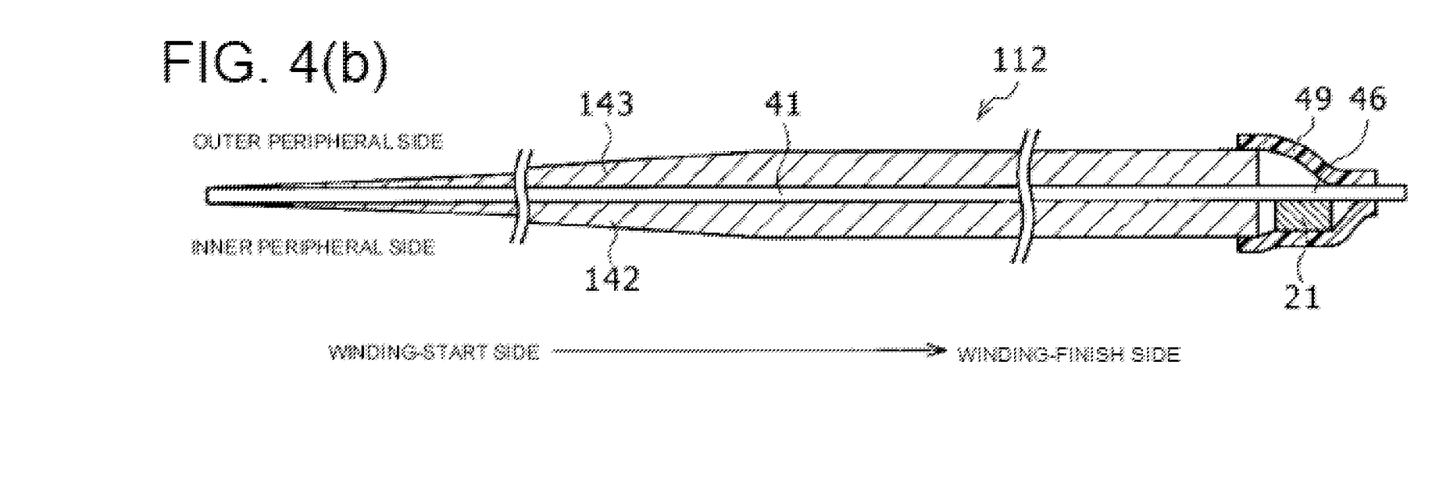
FIG. 4(b) is a schematic sectional view corresponding to FIG. 3(b), in the non-aqueous electrolyte secondary battery in the second embodiment.

FIG. 4(a) is a schematic sectional view of the positive electrode 111 corresponding to FIG. 3(a), in the secondary battery in the second embodiment, and FIG. 4(b) is a schematic sectional view of the negative electrode 112 corresponding to FIG. 3(b), in the secondary battery in the second embodiment.

As illustrated in FIG. 4(a), in the positive electrode 111, a structure of inner and outer mixture layers 132 and 133 in a winding-start region closer to a winding-start side in a winding direction than a positive electrode core exposed part 36 is different from that in the first embodiment. Specifically, regarding each of the positive electrode inner and outer mixture layers 132 and 133, a positive electrode mixture unit amount in the winding-start region is gradually increased toward a winding-finish side in the winding direction. In addition, regarding each of the positive inner and outer mixture layers 132 and 133, the positive electrode mixture unit amount in a winding-finish region closer to a winding-finish side than the positive electrode core exposed part 36 is approximately uniform regardless of a position in the winding direction, and is approximately the same as the maximum positive electrode mixture unit amount in the winding-start region.

As illustrated in FIG. 4(b), regarding each of negative electrode inner and outer mixture layers 142 and 143, a negative electrode mixture unit amount in a winding-start facing region facing the winding-start region across a separator 13, is gradually increased toward the winding-finish side in the winding direction. In addition, regarding each of negative electrode inner and outer mixture layers 142 and 143, the negative electrode mixture unit amount in a winding-finish facing region facing the winding-finish region across the separator 13 is approximately uniform regardless of a position in the winding direction, and is larger than the maximum negative electrode mixture unit amount in the winding-start facing region. Furthermore, regarding each of negative electrode inner and outer mixture layers 142 and 143, the negative electrode mixture unit amount in a positive electrode exposure facing region facing the positive electrode core exposed part 36 across the separator 13 is smoothly changed from a value of the negative electrode mixture unit amount at a winding-finish position of the winding-start facing region to a value of the negative electrode mixture unit amount at a winding-start position of the winding-finish facing region.

Each of the positive electrode inner and outer mixture layers 132 and 133 may be formed in the following manner, for example. Firstly, a positive electrode core 31 is relatively moved with respect to a discharge nozzle from the winding-start side toward the winding-finish side, in a region from the winding-start side to the positive electrode core exposed part 36, and furthermore, during this relative movement, an amount of a positive electrode active material slurry to be discharged from the discharge nozzle onto the positive electrode core 31 is gradually increased. In addition, regarding each of the positive electrode inner and outer mixture layers 132 and 133, the amount of the positive electrode active material slurry to be discharged from the discharge nozzle onto the positive electrode core 31 is maintained uniform when the positive electrode core 31 is relatively moved with respect to the discharge nozzle in the winding-finish region, and the amount to be discharged is set the same as the maximum discharge amount in the winding-start region. In this way, the positive electrode inner and outer mixture layers 132 and 133 can be formed.

In addition, each of the negative electrode inner and outer mixture layers 142 and 143 may be formed in the following manner, for example. Firstly, a negative electrode core 41 is relatively moved with respect to a discharge nozzle from the winding-start side toward the winding-finish side in a region from the winding-start side to a positive electrode exposure facing position facing one place in the positive electrode core exposed part 36, and furthermore, during this relative movement, an amount of a negative electrode active material shiny to be discharged from the discharge nozzle onto the negative electrode core 41 is gradually increased. In addition, the amount of the negative electrode active material slurry to be discharged from the discharge nozzle is set the same as the amount of the negative electrode active material shiny at the positive electrode exposure facing position and is kept uniform, and the negative electrode core 41 is relatively moved with respect to the discharge nozzle from the positive electrode exposure facing position to a negative electrode core exposed part 46. In this way, the negative electrode inner and outer mixture layers 142 and 143 can be formed.

According to the second embodiment, in each of the positive electrode inner and outer mixture layers 132 and 133, the positive electrode mixture unit amount is gradually increased toward the winding-finish side in a region from the winding-start end to the positive electrode core exposed part 36. Accordingly, the positive electrode mixture unit amount at a position on the winding-start side where the curvature is large can be reduced as the curvature increases. In addition, in each of the negative electrode inner and outer mixture layers 142 and 143, the negative electrode mixture unit amount is gradually increased toward the winding-finish side in a region from the winding-start end to the positive electrode exposure facing position. Accordingly, the negative electrode mixture unit amount on the winding-start side where the curvature is large can be reduced as the curvature increases. This can suppress the occurrence of breakages and cracks in the mixture layers 132, 133, 142, and 143 further effectively.

Third Embodiment

Figure 5A:
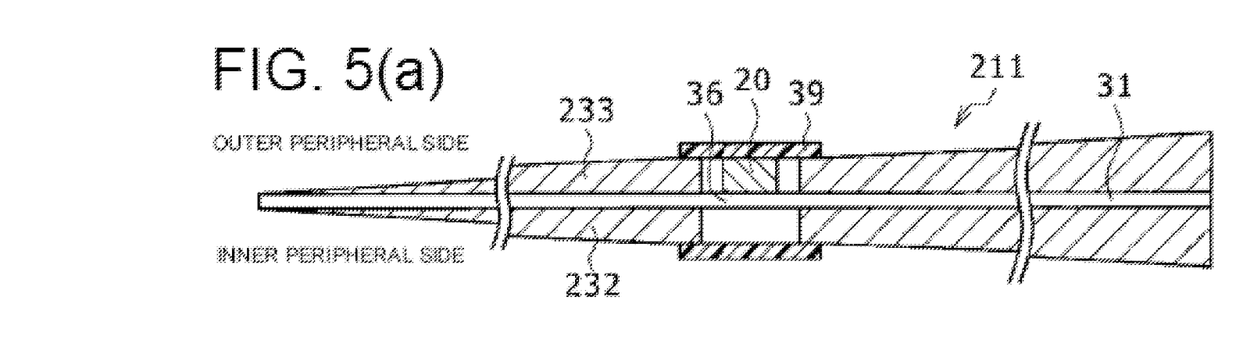
FIG. 5(a) is a schematic sectional view corresponding to FIG. 3(a), in a non-aqueous electrolyte secondary battery in a third embodiment.
Figure 5B:
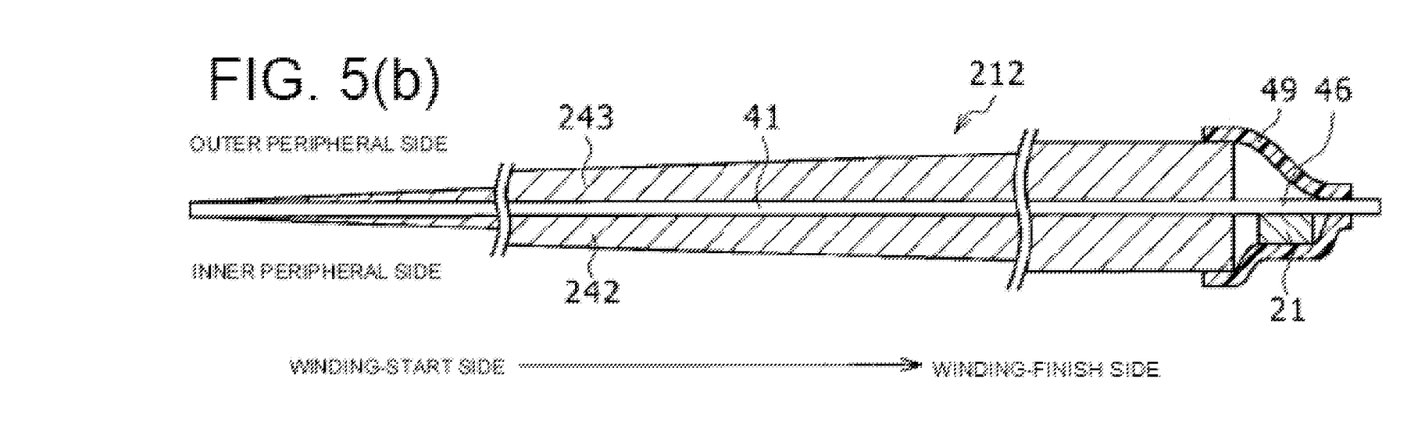
FIG. 5(b) is a schematic sectional view corresponding to FIG. 3(b), in the non-aqueous electrolyte secondary battery in the third embodiment.

Next, a secondary battery in a third embodiment will be described. FIG. 5(a) is a schematic sectional view of a positive electrode 211 corresponding to FIG. 3(a), in the secondary battery in the third embodiment, and FIG. 5(b) is a schematic sectional view of a negative electrode 212 corresponding to FIG. 3(b), in the secondary battery in the third embodiment.

The positive electrode 211 is different from the positive electrode 111 described in the second embodiment only in that in each of positive electrode inner and outer mixture layers 232 and 233, a positive electrode mixture unit amount in a winding-finish region is gradually increased toward a winding-finish side. In addition, the negative electrode 212 is different from the negative electrode 112 in the second embodiment in that in each of negative electrode inner and outer mixture layers 242 and 243, a negative electrode mixture unit amount is gradually increased from a winding-start end to a negative electrode core exposed part 46. A method of gradually increasing the positive electrode mixture unit amount toward the winding-finish side in the winding-finish region and a method of gradually increasing the negative electrode mixture unit amount toward the winding-finish side can be implemented in a manner similar to that described in the second embodiment, for example.

According to the third embodiment, when the total amount of the mixtures is the same as that in the second embodiment, the gradient of the mixture unit amount of each of the mixture layers 232, 233, 242, and 243 can be reduced. Accordingly, a film thickness difference in the winding direction of each of the mixture layers 232, 233, 242, and 243 formed by drying and compressing an active material slurry can be reduced, whereby the positive electrode 211 and the negative electrode 212 can be smoothly wound in closer contact with each other.

Fourth Embodiment

Figure 6A:
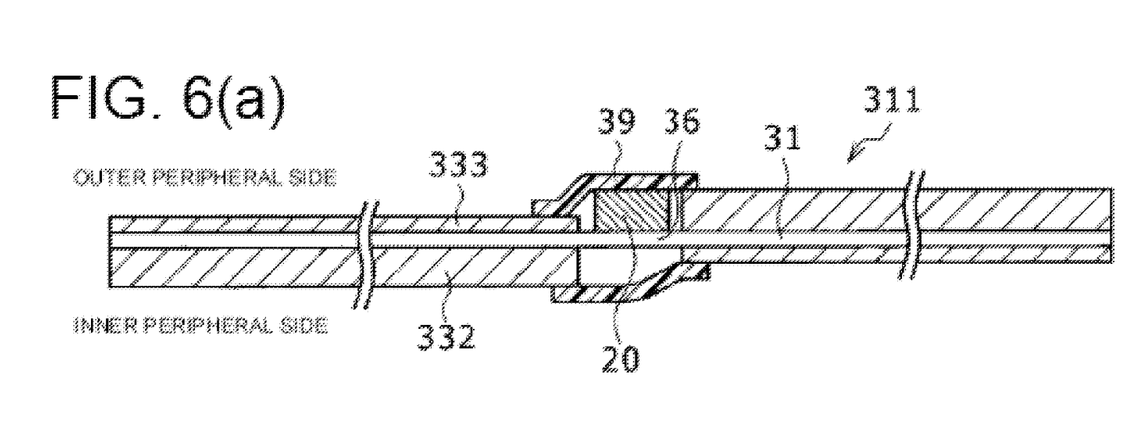
FIG. 6(a) is a schematic sectional view corresponding to FIG. 3(a), in a non-aqueous electrolyte secondary battery in a fourth embodiment.
Figure 6B:
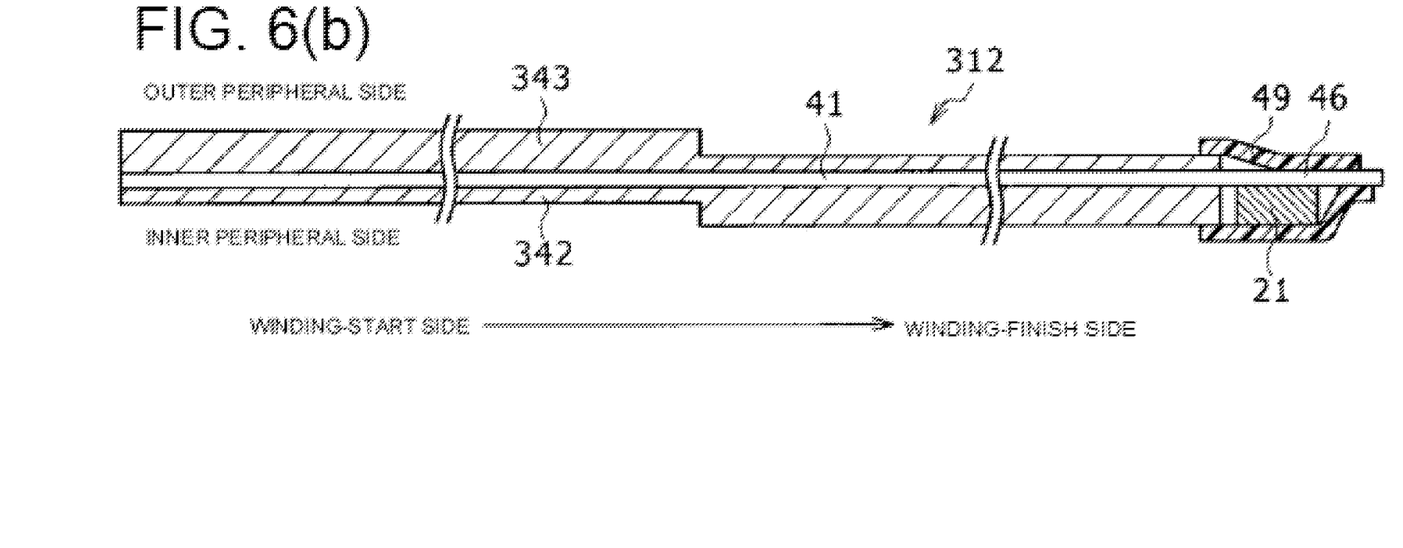
FIG. 6(b) is a schematic sectional view corresponding to FIG. 3(b), in the non-aqueous electrolyte secondary battery in the fourth embodiment.

Next, a secondary battery in a fourth embodiment will be described. FIG. 6(a) is a schematic sectional view of a positive electrode 311 corresponding to FIG. 3(a), in the secondary battery in the fourth embodiment, and FIG. 6(b) is a schematic sectional view of a negative electrode 312 corresponding to FIG. 3(b), in the secondary battery in the fourth embodiment.

Regarding the positive electrode 311 in the fourth embodiment, in a winding-start region closer to a winding-start side than a positive electrode core exposed part 36, a positive electrode mixture unit amount of each of the positive electrode inner and outer mixture layers 332 and 333 is approximately uniform regardless of a position in a winding direction, and furthermore, at each position in the winding direction, the positive electrode mixture unit amount of the positive electrode inner mixture layer 332 is larger than the positive electrode mixture unit amount of the positive electrode outer mixture layer 333. On the other hand, regarding the positive electrode 311, in a winding-finish region closer to a winding-finish side than the positive electrode core exposed part, the positive electrode mixture unit amount of each of the positive electrode inner and outer mixture layers 332 and 333 is approximately uniform regardless of a position in the winding direction, and furthermore, at each position in the winding direction, the positive electrode mixture unit amount of the positive electrode inner mixture layer 332 is smaller than the positive electrode mixture unit amount of the positive electrode outer mixture layer 333. In addition, the total positive electrode mixture unit amount obtained by adding the positive electrode mixture unit amount of the positive electrode inner mixture layer 332 and the positive electrode mixture unit amount of the positive electrode outer mixture layer 333 at the same position in the winding direction in the winding-start region is approximately the same as the total positive electrode mixture unit amount obtained by adding the positive electrode mixture unit amount of the positive electrode inner mixture layer 332 and the positive electrode mixture unit amount of the positive electrode outer mixture layer 333 at the same position in the winding direction in the winding-finish region.

On the other hand, regarding the negative electrode 312 in the fourth embodiment, in a region from the winding-start end to a positive electrode exposure facing position facing one position of the positive electrode core exposed part across a separator 13, a negative electrode mixture unit amount of each of negative electrode inner and outer mixture layers 342 and 343 is approximately uniform regardless of a position in the winding direction, and furthermore, the negative electrode mixture unit amount of the negative electrode inner mixture layer 342 is smaller than the negative electrode mixture limit amount of the negative electrode outer mixture layer 343. In addition, regarding the negative electrode 312, in a region from the positive electrode exposure facing position to a negative electrode core exposed part, the negative electrode mixture unit amount of each of the negative electrode inner and outer mixture layers 342 and 343 is approximately uniform regardless of a position in the winding direction, and furthermore, the negative electrode mixture unit amount of the negative electrode inner mixture layer 342 is larger than the negative electrode mixture unit amount of the negative electrode outer mixture layer 343. In addition, the total negative electrode mixture unit amount obtained by adding the negative electrode mixture unit amount of the negative electrode inner mixture layer 342 and the negative electrode mixture unit amount of the negative electrode outer mixture layer 343 at the same position in the winding direction in the region from the winding-start end to the positive electrode exposure facing position is approximately the same as the total negative electrode mixture unit amount obtained by adding the negative electrode mixture unit amount of the negative electrode inner mixture layer 342 and the negative electrode mixture unit amount of the negative electrode outer mixture layer 343 at the same position in the winding direction in the region from the positive electrode exposure facing position to the negative electrode core exposed part.

According to the fourth embodiment, in the negative electrode 312 wound from the inside of the positive electrode 311, the negative electrode inner mixture layer 342 is provided on an inner peripheral side where the curvature is large, in which the negative electrode mixture unit amount in a region from the winding-start end to the positive electrode exposure facing position is smaller than the negative electrode mixture unit amount in the region from the positive electrode exposure facing position to the negative electrode core exposed part. This can effectively suppress damage to the negative electrode inner mixture layer 342 which is the most susceptible damage in the winding-start end portion, and, as a result, the damage to the electrode body can also be suppressed effectively.

The positive electrode 311 can be formed by only decreasing or increasing, by one step, the positive electrode mixture unit amount of each of the positive electrode inner and outer mixture layers 332 and 333 across the positive electrode core exposed part 36. The negative electrode 312 can be formed by only increasing or decreasing, by one step, the negative electrode mixture unit amount of each of the negative electrode inner and outer mixture layers 342 and 343 at the positive electrode exposure facing position. Therefore, this facilitates the discharge control of the positive electrode active material slurry and the negative electrode active material slurry, whereby the positive electrode 311 and the negative electrode 312 can be easily formed.

In addition, the total positive electrode mixture unit amount at each position in the winding direction in the winding-start region approximately coincides with the total positive electrode mixture unit amount at each position in the winding direction in the winding-finish region, and the total negative electrode mixture unit amount at each position in the winding direction of the negative electrode mixture is approximately uniform in a region from the winding-start end to the negative electrode core exposed part 46. Accordingly, the sum of the thicknesses of the positive electrode inner mixture layer 332 and the positive electrode outer mixture layer 333 can be approximately uniform regardless of a position in the winding direction, and the sum of the thicknesses of the negative electrode inner mixture layer 342 and the negative electrode outer mixture layer 343 can be approximately uniform regardless of a position in the winding direction. Accordingly, since the sum of the thicknesses of the positive electrode inner mixture layer 332 and the positive electrode outer mixture layer 333 and the sum of the thicknesses of the negative electrode inner mixture layer 342 and the negative electrode outer mixture layer 343 are not significantly changed depending on the winding position, ions and electrons can be moved smoothly.

Furthermore, the sum of the thicknesses of the positive electrode inner mixture layer 332 and the positive electrode outer mixture layer 333 can be approximately uniform regardless of a position in the winding direction, and the sum of the thicknesses of the negative electrode inner mixture layer 342 and the negative electrode outer mixture layer 343 can be approximately uniform regardless of a position in the winding direction. Accordingly, the sum of the thicknesses of the positive electrode inner mixture layer 332 and the positive electrode outer mixture layer 333 is almost unchanged between the region closer to the winding-start side than the positive electrode core exposed part 36 and the region closer to the winding-finish side than the positive electrode core exposed part 36. Thus, distortion hardly occurs in an insulating tape 39 that is attached to the positive electrode inner mixture layer 332 and the positive electrode outer mixture layer 333 and covers a positive electrode lead 20, and the insulating tape 39 is not easily peeled off.

Note that the present disclosure is not limited to the above-described embodiments and variations thereof but various improvements and changes can be made within the range of the matters described in the claims of the present application and equivalents of the matters.

Figure 7A:
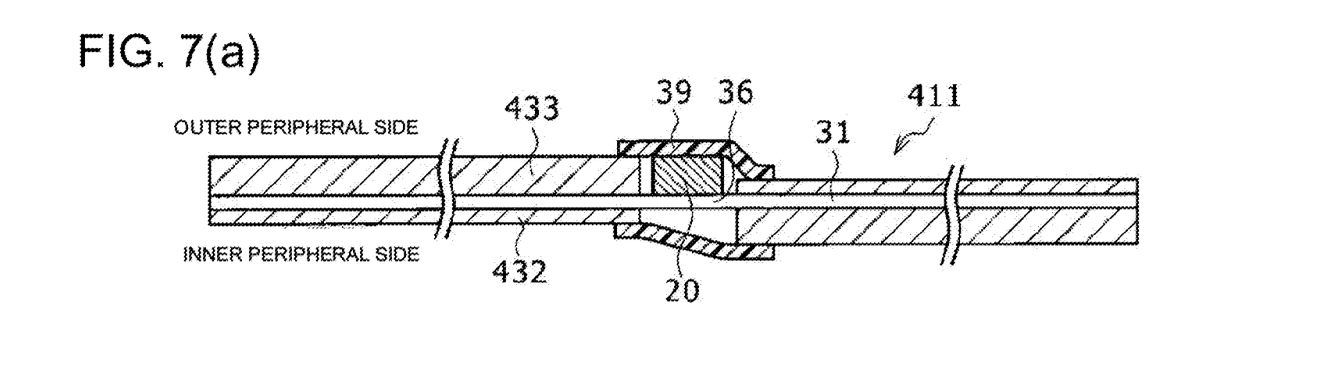
FIG. 7(a) is a schematic sectional view corresponding to FIG. 6(a), in a non-aqueous electrolyte secondary battery in a variation of the fourth embodiment.
Figure 7B:
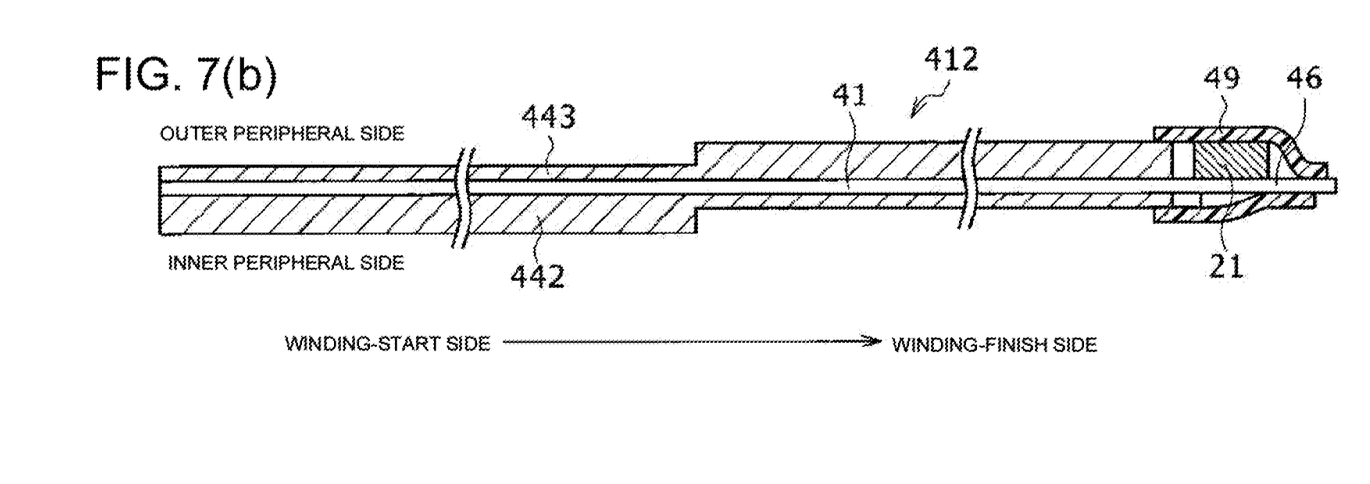
FIG. 7(b) is a schematic sectional view corresponding to FIG. 6(b), in the non-aqueous electrolyte secondary battery in the variation of the fourth embodiment.

For example, as illustrated in FIG. 7($a$), that is, a schematic sectional view of a positive electrode 411 corresponding to FIG. 6($a$) in a secondary battery in a variation of the fourth embodiment, the relationship between the positive electrode mixture unit amounts of positive electrode inner and outer mixture layers 432 and 433 may be reversed from the relationship between the positive electrode mixture unit amounts of the positive electrode inner and outer mixture layers 332 and 333 of the positive electrode 311 in the fourth embodiment. In addition, as illustrated in FIG. 7($b$), that is, a schematic sectional view of a negative electrode 412 corresponding to FIG. 6($b$) in the secondary battery in the variation of the fourth embodiment, the relationship between the negative electrode mixture unit amounts of negative electrode inner and outer mixture layers 442 and 443 may be reversed from the relationship between the negative electrode mixture unit amounts of the negative electrode inner and outer mixture layers 342 and 343 of the negative electrode 312 in the fourth embodiment.

In at least one of the winding-start region and the winding-finish region, at least one of the positive electrode inner mixture layer and the positive electrode outer mixture layer may include a region where the positive electrode mixture unit amount is approximately uniform toward the winding-finish end and a region where the positive electrode mixture unit amount is increased toward the winding-finish end. In addition, in at least one of the winding-start facing region and the winding-finish facing region, at least one of the negative electrode inner mixture layer and the negative electrode outer mixture layer may include a region where the negative electrode mixture unit amount is approximately uniform toward the winding-finish end and a region where the negative electrode mixture unit amount is increased toward the winding-finish end. In all of the above-described embodiments and variations, a case where the first electrode is a positive electrode and the second electrode is a negative electrode has been described. However, the first electrode may be a negative electrode, and the second electrode may be a positive electrode.

That is, it is only required that the winding-type electrode body of the present disclosure is a winding-type electrode body of a non-aqueous electrolyte secondary battery, in which a long first electrode and a long second electrode are wound together with a separator interposed therebetween. In addition, it is only required that the first electrode includes a long first electrode core, a first electrode inner mixture layer provided on an inner surface of the first electrode core, and a first electrode outer mixture layer provided on an outer surface of the first electrode core, and that the second electrode includes a long second electrode core, a second electrode inner mixture layer provided on an inner surface of the second electrode core, and a second electrode outer mixture layer provided on an outer surface of the second electrode core. It is only required that the first electrode includes a first electrode core exposed part that is positioned spaced from both of a winding-start end and a winding-finish end in a winding direction so that the first electrode core is exposed, with a first electrode lead being electrically connected to the first electrode core exposed part. Furthermore, it is only required that in a winding-start region closer to a winding-start side in the winding direction than the first core exposed part, a first electrode mixture unit amount, which is a first electrode mixture amount per unit in the winding direction of each of the first electrode inner mixture layer and the first electrode outer mixture layer, is approximately uniform or is increased toward a winding-finish side in the winding direction. In addition, it is only required that in a winding-start facing region facing the winding-start region across the separator, a second electrode mixture unit amount, which is a second electrode mixture amount per unit in the winding direction of each of the second electrode inner mixture layer and the second electrode outer mixture layer, is approximately uniform or is increased toward the winding-finish side in the winding direction. It is only required that each of the first electrode inner mixture layer and the first electrode outer mixture layer has the first electrode mixture unit amounts different between two or more positions in the winding direction except for a region in the winding direction where the first electrode core exposed part is provided, and each of the second electrode inner mixture layer and the second electrode outer mixture layer includes a changing part where the second electrode mixture unit amount is changed toward the winding-finish side in the winding direction.

REFERENCE SIGNS LIST 10 secondary battery
11, 111, 211, 311, 411 positive electrode
12, 112, 212, 312, 412 negative electrode
13 separator
15 battery case
20 positive electrode lead
31 positive electrode core
32, 132, 232, 332, 432 positive electrode inner mixture layer
33, 133, 233, 333, 433 positive electrode outer mixture layer
36 positive electrode core exposed part
39 insulating tape
41 negative electrode core
42, 142, 242, 342, 442 negative electrode inner mixture layer
43, 143, 243, 343, 443 negative electrode outer mixture layer

The invention claimed is:

1. A winding-type electrode body of a non-aqueous electrolyte secondary battery, the winding-type electrode body comprising a long first electrode and a long second electrode wound together with a separator interposed therebetween, wherein
the first electrode includes a long first electrode core, a first electrode inner mixture layer provided on an inner surface of the first electrode core, and a first electrode outer mixture layer provided on an outer surface of the first electrode core; the second electrode includes a long second electrode core, a second electrode inner mixture layer provided on an inner surface of the second electrode core, and a second electrode outer mixture layer provided on an outer surface of the second electrode core,
the first electrode includes a first electrode core exposed part that is positioned spaced from both of a winding-start end and a winding-finish end in a winding direction, and exposes the first electrode core to be electrically connected with a first electrode lead,
in a winding-start region closer to a winding-start side in the winding direction than the first electrode core exposed part, a first electrode mixture unit amount, which is a first electrode mixture amount per unit length in the winding direction of each of the first electrode inner mixture layer and the first electrode outer mixture layer, is approximately uniform or is increased toward a winding-finish side in the winding direction,
in a winding-start facing region facing the winding-start region across the separator, a second electrode mixture unit amount, which is a second electrode mixture amount per unit length in the winding direction of each of the second electrode inner mixture layer and the second electrode outer mixture layer, is approximately uniform or is increased toward the winding-finish side in the winding direction,
each of the first electrode inner mixture layer and the first electrode outer mixture layer has the first electrode mixture unit amount that differs at two or more positions in the winding direction except for a region in the winding direction where the first electrode core exposed part is provided,
each of the second electrode inner mixture layer and the second electrode outer mixture layer includes a changing part where the second electrode mixture unit amount is changed toward the winding-finish side in the winding direction,
in each of the first electrode inner mixture layer and the first electrode outer mixture layer, a first electrode winding-start mixture unit amount, which is the first electrode mixture unit amount in the winding-start region, is approximately uniform regardless of a position in the winding direction; a first electrode winding-finish mixture unit amount, which is the first electrode mixture unit amount in a winding-finish region closer to the winding-finish side than the first electrode core exposed part, is approximately uniform regardless of a position in the winding direction, and is larger than the first electrode winding-start mixture unit amount, and
in each of the second electrode inner mixture layer and the second electrode outer mixture layer, a second electrode winding-start mixture unit amount, which is the second electrode mixture unit amount in the winding-start facing region, is approximately uniform regardless of a position in the winding direction; a second electrode winding-finish mixture unit amount, which is the second electrode mixture unit amount in a winding-finish facing region facing the winding-finish region across the separator, is approximately uniform regardless of a position in the winding direction, and is larger than the second electrode winding-start mixture unit amount.

2. The winding-type electrode body according to claim 1, wherein
in each of the first electrode inner mixture layer and the first electrode outer mixture layer, a first electrode winding-start mixture unit amount, which is the first electrode mixture unit amount in the winding-start region, is gradually increased toward the winding-finish side in the winding direction, and in each of the second electrode inner mixture layer and the second electrode outer mixture layer, a second electrode winding-start mixture unit amount, which is the second electrode mixture unit amount in the winding-start facing region, is gradually increased toward the winding-finish side in the winding direction.

3. The winding-type electrode body according to claim 2, wherein a first electrode winding-finish mixture unit amount, which is the first electrode mixture unit amount in a winding-finish region closer to the winding-finish side than the first electrode core exposed part, is approximately uniform regardless of a position in the winding direction, and is equal to or larger than a maximum value of the first electrode winding-start mixture unit amount, and a second electrode winding-finish mixture unit amount, which is the second electrode mixture unit amount in a winding-finish facing region facing the winding-finish region across the separator, is approximately uniform regardless of a position in the winding direction, and is equal to or larger than a maximum value of the second electrode winding-start mixture unit amount.

4. The winding-type electrode body according to claim 1, further comprising an insulating tape, wherein the insulating tape is attached to the first electrode lead, and to portions in the first electrode inner mixture layers that are positioned on both sides of the first electrode core exposed part in the winding direction, and covers a part of the first electrode lead, when the first electrode inner mixture layers are positioned on both sides of the first electrode lead in the winding direction; the insulating tape is attached to the first electrode lead, and to portions in the first electrode outer mixture layers that are positioned on both sides of the first electrode core exposed part in the winding direction, and covers a part of the first electrode lead, when the first electrode outer mixture layers are positioned on both sides of the first electrode lead in the winding direction.

5. A non-aqueous electrolyte secondary battery, comprising:

a battery case having a chamber therein;

the winding-type electrode body according to claim 1, the winding-type electrode body being housed in the chamber; and a non-aqueous electrolyte housed in the chamber.

6. A winding-type electrode body of a non-aqueous electrolyte secondary battery, the winding-type electrode body comprising a long first electrode and a long second electrode wound together with a separator interposed therebetween, wherein the first electrode includes a long first electrode core, a first electrode inner mixture layer provided on an inner surface of the first electrode core, and a first electrode outer mixture layer provided on an outer surface of the first electrode core; the second electrode includes a long second electrode core, a second electrode inner mixture layer provided on an inner surface of the second electrode core, and a second electrode outer mixture layer provided on an outer surface of the second electrode core, the first electrode includes a first electrode core exposed part that is positioned spaced from both of a winding-start end and a winding-finish end in a winding direction, and exposes the first electrode core to be electrically connected with a first electrode lead, in a winding-start region closer to a winding-start side in the winding direction than the first electrode core exposed part, a first electrode mixture unit amount, which is a first electrode mixture amount per unit length in the winding direction of each of the first electrode inner mixture layer and the first electrode outer mixture layer, is approximately uniform or is increased toward a winding-finish side in the winding direction, in a winding-start facing region facing the winding-start region across the separator, a second electrode mixture unit amount, which is a second electrode mixture amount per unit length in the winding direction of each of the second electrode inner mixture layer and the second electrode outer mixture layer, is approximately uniform or is increased toward the winding-finish side in the winding direction, each of the first electrode inner mixture layer and the first electrode outer mixture layer has the first electrode mixture unit amount that differs at two or more positions in the winding direction except for a region in the winding direction where the first electrode core exposed part is provided, each of the second electrode inner mixture layer and the second electrode outer mixture layer includes a changing part where the second electrode mixture unit amount is changed toward the winding-finish side in the winding direction, in each of the first electrode inner mixture layer and the first electrode outer mixture layer, a first electrode winding-start mixture unit amount, which is the first electrode mixture unit amount in the winding-start region, is gradually increased toward the winding-finish side in the winding direction, in each of the second electrode inner mixture layer and the second electrode outer mixture layer, a second electrode winding-start mixture unit amount, which is the second electrode mixture unit amount in the winding-start facing region, is gradually increased toward the winding-finish side in the winding direction, a first electrode winding-finish mixture unit amount, which is the first electrode mixture unit amount in a winding-finish region closer to the winding-finish side than the first electrode core exposed part, is approximately uniform regardless of a position in the winding direction, and is equal to or larger than a maximum value of the first electrode winding-start mixture unit amount, and a second electrode winding-finish mixture unit amount, which is the second electrode mixture unit amount in a winding-finish facing region facing the winding-finish region across the separator, is approximately uniform regardless of a position in the winding direction, and is equal to or larger than a maximum value of the second electrode winding-start mixture unit amount.

\* \* \* \* \*